Dec. 15, 1936.  R. M. WHITE  2,064,135
SUGAR CARBONATION PROCESS AND APPARATUS
Filed June 6, 1933
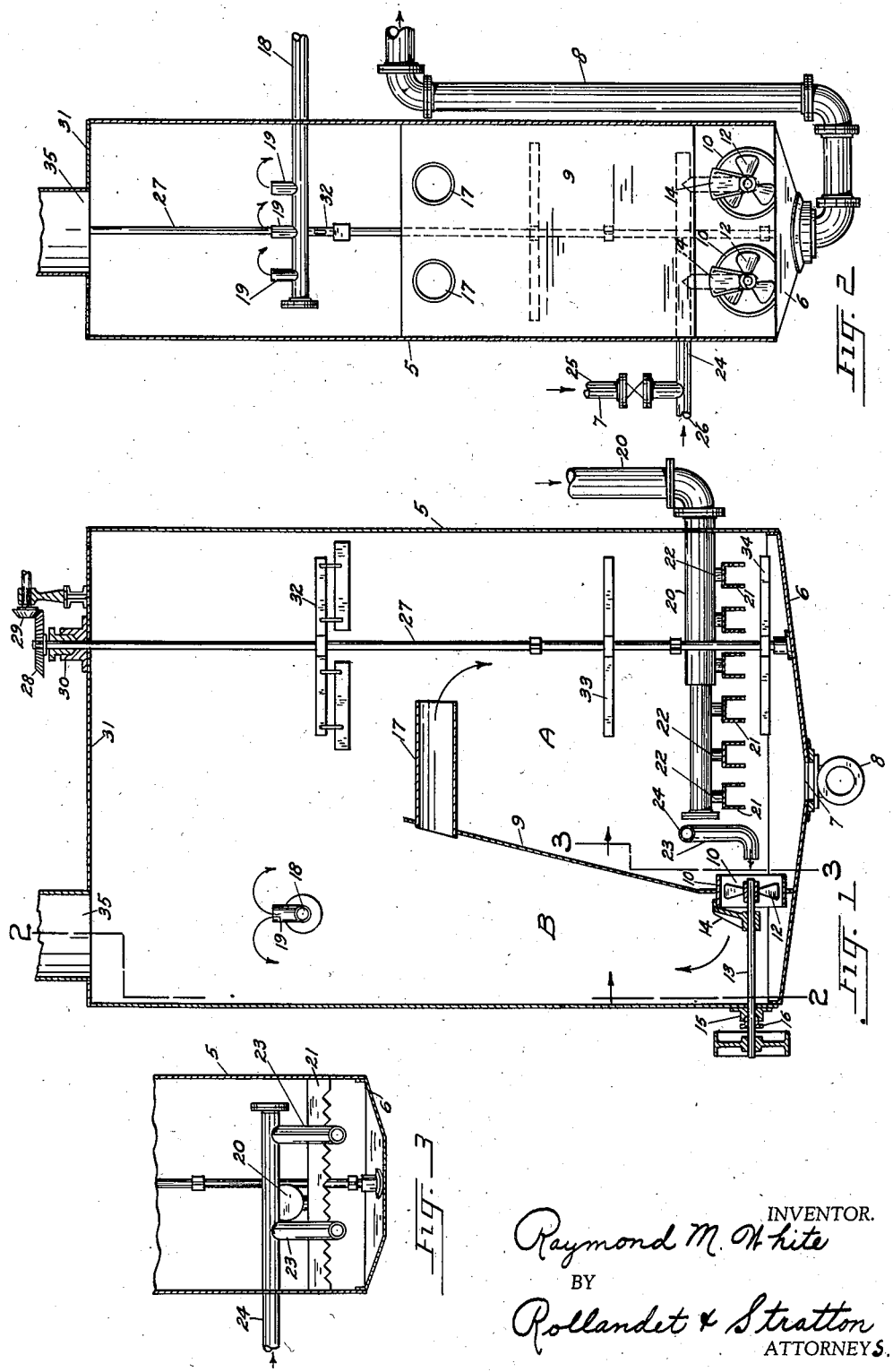
INVENTOR.
Raymond M. White
BY
Rollandet & Stratton
ATTORNEYS.

Patented Dec. 15, 1936

2,064,135

UNITED STATES PATENT OFFICE 2,064,135

SUGAR CARBONATION PROCESS AND APPARATUS

Raymond M. White, Denver, Colo.

Application June 6, 1933, Serial No. 674,523

7 Claims. (Cl. 127—51)

This invention relates to the treatment of juices in the production of sugar, and more particularly to a purifying action in the process commonly known as the carbonation step. In this step, the sugar juices are reduced from an acid state to an alkaline condition by the addition of lime, and the limed or defecated juices are subjected to the action of carbon dioxide gas, which causes the precipitation of gums and other non-sugars.

The carbonation step may be performed in two stages usually referred to as first and second carbonation, and while I do not limit myself to the use of the present invention at any particular point in the process, it is considered to be of most value as an improvement in the first carbonation step.

While the juices are being defecated and carbonated, as stated hereinbefore, raw or partly defecated juices are added in a continuous operation, subject to a simultaneous withdrawal of substantially equal quantities of carbonated juices and precipitates.

The present invention relates particularly to this process of continuous defecation and carbonation as outlined hereinabove, and it is an object of the invention to promote and expedite the process, by subjecting the continuously supplied raw or partly defecated juices, thoroughly and intimately to the actions of lime and carbonating gases, immediately upon their introduction into the previously defecated and carbonated mass under treatment, by a method of continuous and vigorous circulation obtained by a novel arrangement of parts.

Owing to this immediate and thorough intermixing of the added juices with the larger volume of defecated and carbonating juices, a more perfect granular structure of the precipitate is obtained thereby increasing the filterability of the product of the carbonation step. The apparatus comprised in the present invention is of extremely simple construction, and its operation may be effected with a comparatively small expenditure of power and at a correspondingly reduced cost of operation.

It is a further object of the invention to employ in obtaining the above beneficial results, a mixing and circulating element in the form of one or more "ship propellers," which, in a simple operation with the minimum of frictional resistance, provide in a continuous action, a large displacement and a vigorous circulating impulse, as is required in attaining the beneficial results of my invention as outlined hereinbefore.

Other objects of the invention reside in details of construction and in novel and advantageous combinations and arrangements of parts, as will be fully brought out in the course of the following description.

In the accompanying drawing, in the several views of which like parts are similarly designated, Figure 1 is a sectional vertical elevation of an apparatus embodying the mechanical features of the invention, Figure 2 is a section taken on the line 2—2 of Figure 1, and Figure 3 is a section along the line 3—3 of Figure 1.

Referring further to the drawing, the improved carbonation process is carried on in a tank 5 of suitable form and size, having centrally of its sloping bottom 6, an outlet 7 for carbonated juices and precipitate. A goose-neck conduit 8 connected with the outlet, extends upwardly lengthwise of the tank to provide at a suitable elevation, a point of overflow which determines the level of the liquid content of the tank.

A partition 9 extending slantingly upwardly from the bottom of the tank to, or in proximity to, the established liquid level, divides the interior of the tank into two compartments A and B which communicate for the passage of material from one to another by one or more openings in the bottom portion of the partition.

Disposed in open-ended housings 10 fitted in these openings, are circulating elements in the form of ship-propellers 12, the shafts 13 of which are supported in bearings 14 and 15 and project outside the tank 5 for their connection with a conveniently located motor or other source of energy. The bearings 15 through which the shafts extend at the wall of the tank are provided with stuffing boxes 16 for the usual purpose of providing water-tight joints.

At the upper end of the slanting partition 9 are one or more spouts or nozzles 17, which extend from the compartment B to substantially the middle of the compartment A, for the delivery of the circulating fluid into the very heart of the volume contained in said compartment.

Lime in any desired form, as for example, as milk of lime or as milk of saccharate, is continuously supplied to the tank through a pipe 18 having upwardly ranging outlets 19. Carbon dioxide ($CO_2$) gas is introduced into the lower portion of the tank, through a conduit 20 having as usual a series of inverted and serrated troughs 21 connected with a plurality of outlets 22 for the better distribution of the gas through the volume of juices in the tank. Raw juices or partly defecated raw juices are continuously introduced into the tank immediately forward of and in close proximity to the propellers 12, through downwardly extending branches 23 of a pipe 24 connected with a conveniently disposed source of supply, by means of a valve-controlled pipe 25. Lime may be added to the juices entering through the pipe 24, at a point 26.

An agitating element in the tank comprises an upright shaft 27 connected with the motor or other driving element by gears 28 and 29 at its upper end, which projects thru a stuffing box 30 on the closed top 31 of the tank. The shaft 27 is equipped with paddles or blades at different elevations, as shown at 32, 33, and 34.

An opening 35 in the top of the tank provides a vent for the escape of gases.

In the operation of the apparatus, lime or limed juice, $CO_2$ gas and raw or partly defecated juices are continuously supplied to the tank, and carbonated juices and precipitates are continuously withdrawn from the tank in quantities sufficient to maintain the predetermined liquid level.

The carbon dioxide gases pumped into the tank bubble upwardly in the compartment A through a constantly downwardly moving volume of juices and are thus readily absorbed by the lime in the juices to form calcium carbonate which reduces the alkalinity of the juice itself and causes the precipitation of gums and other non-sugars. The juice is continually overflowed in an amount equal to the raw or partly defecated juice and milk of lime or milk of saccharate, which is being continually added through the respective conduits, and the process is thus continuously performed. The juices discharged from the tank are conducted to filters or other purification devices, in accordance with regular standard practice.

The juices in compartment A are forcefully drawn into the compartment B by the action of the rapidly revolving propellers, and being forced upwardly in the compartment B reenter the compartment A through the projecting nozzles 17. A rapid and vigorous circulatory movement of the juices in the direction of the arrows shown in Figure 1, is thus continuously maintained by the revolving motion of the propellers whose displacement is continuous and of maximum capacity with reference to the size of the openings in which they are disposed. During this circulatory movement of the juices, raw or partly defecated sugar juices are constantly introduced into the circulating mass, immediately forward of the propellers, with the result that, owing to the instant action of the propellers upon the entering juices, they are thoroughly disseminated throughout the carbonated juices the moment they enter the tank, in a continuous and uninterrupted operation.

As a result of this instant and continuous intermingling of the added juices with the carbonating juices in a constantly maintained vigorous circulatory movement, the efficiency of the process is at all times at or near its maximum, and the capacity of the apparatus used in performing the process is correspondingly great.

It will be apparent that the wide range of vigorous circulation, is obtained at the minimum expenditure of power and that the immediate, thorough and continuous intermixture of the added raw or partly defecated juices with the circulating stream, causes a coagulation of the gums and colloidal impurities, which, upon further treatment with lime and carbon dioxide gas, will produce an improved granular precipitate. This precipitate is readily separated from the juices by subsequent filtration according to any known and approved method.

What I claim and desire to secure by Letters Patent is:

1. In a process of treating sugar juice in the manufacture of sugar, the method of liming and carbonating sugar-juices in a continuous operation, comprising the production of a circulatory movement of raw sugar juices in the presence of defecating and carbonating agents, in an upwardly and downwardly directed stream, and adding to said stream at the lowermost portion thereof raw or partly defecating juice under an instant disseminating influence, the defecating agent being introduced into the upwardly moving current of the stream, and the carbonating agent being introduced into the downwardly moving current of the stream in an upwardly ranging movement.

2. Apparatus for liming and carbonating sugar-juices comprising a tank, a partition dividing the tank into compartments and having in the lower portion of the tank, a passage between the compartments, a propeller in said passage, a nozzle at the upper portion of the partition for the passage of circulating juices from one compartment to a point in the other compartment, remote from the partition, means for the supply of defecating and carbonating agents to the tank, and means for the supply of raw or partly defecated juice to the tank, adjacent the propeller.

3. Apparatus for liming and carbonating sugar-juices, comprising in combination with sources for the supply of carbonating and defecating agents, a tank, a partition dividing the tank into compartments and having in the lower portion of the tank, a passage between the compartments, a propeller in said passage, means for the supply of a defecating agent from its source above one compartment, means for the supply of a carbonating agent from its source to the other compartment, and means for the supply of raw or partly defecated juice to the tank, adjacent the propeller.

4. Apparatus for liming and carbonating sugar juices, comprising a tank divided into two compartments connected by a passage at their lower ends, there being an overflow for material from one compartment to the other, a propeller in the area of said passage, means for delivering raw or partly defecated sugar juice to the tank having an outlet in close proximity to the propeller, and means for delivering a defecating agent and a carbonating agent to the tank.

5. Apparatus for liming and carbonating sugar juices comprising a tank, a partition dividing the tank into two compartments, an open ended housing mounted in the lower part of said partition, a propeller mounted in said housing on a horizontal axis, a nozzle in the upper portion of the partition for the passage of circulating juices from one compartment into the other compartment, means for delivering raw or partly defecated sugar juice immediately forward of the propeller, and means for supplying the defecating and carbonating agents to the tank.

6. In a process for treating juices in the production of sugar, the method of carbonating the juices, comprising subjecting a mixture of raw juice and partially defecated juice to a succession of steps in a circulatory and agitated movement, the steps consisting consecutively with relation to the direction of said movement, in liming the mixture, carbonating the limed juices and eliminating part of the limed and carbonated juices from the circulating stream, and the steps being spaced in time to provide reaction periods between each two consecutive steps.

7. In a process for treating sugar juices in the manufacture of sugar, the method of liming and carbonating sugar juices in a continuous operation which comprises a cyclic movement of the sugar juices to be treated, and the introduction of raw juice, a liming agent and a carbonation agent, at successive stages of the cyclic movement into the circulating and agitated stream, there being an interval for reaction in the cyclic movement following each introduction stage before the juices reach the next succeeding introduction stage.

RAYMOND M. WHITE.